L. HOLLAND-LETZ.
TRACTION WHEEL.
APPLICATION FILED APR. 1, 1912.
1,192,897.
Patented Aug. 1, 1916.
3 SHEETS—SHEET 2.
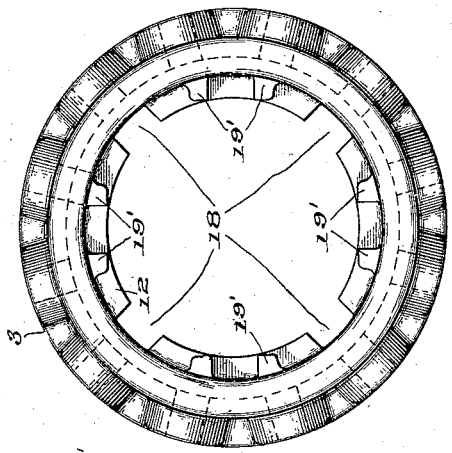
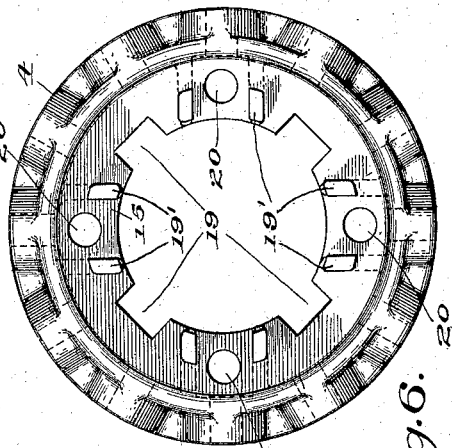
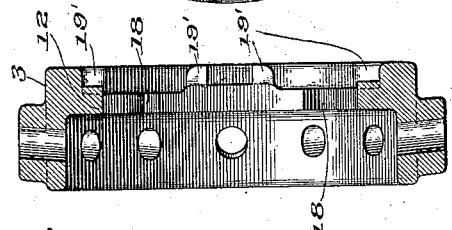
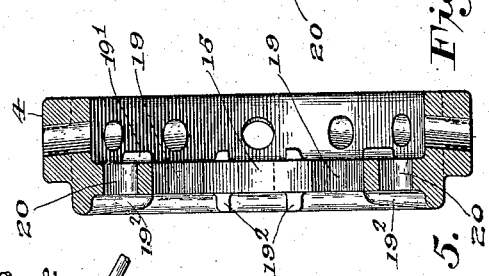
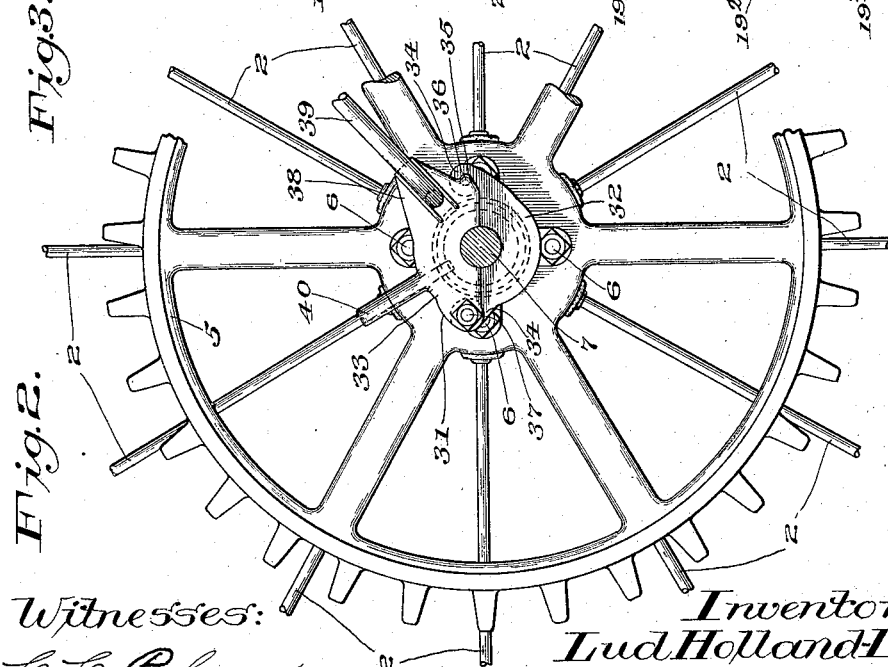
Witnesses:
C. C. Palmer
F. W. Hoffmeister
Inventor.
Lud. Holland-Letz,
By E.W. Burgess
Attorney.

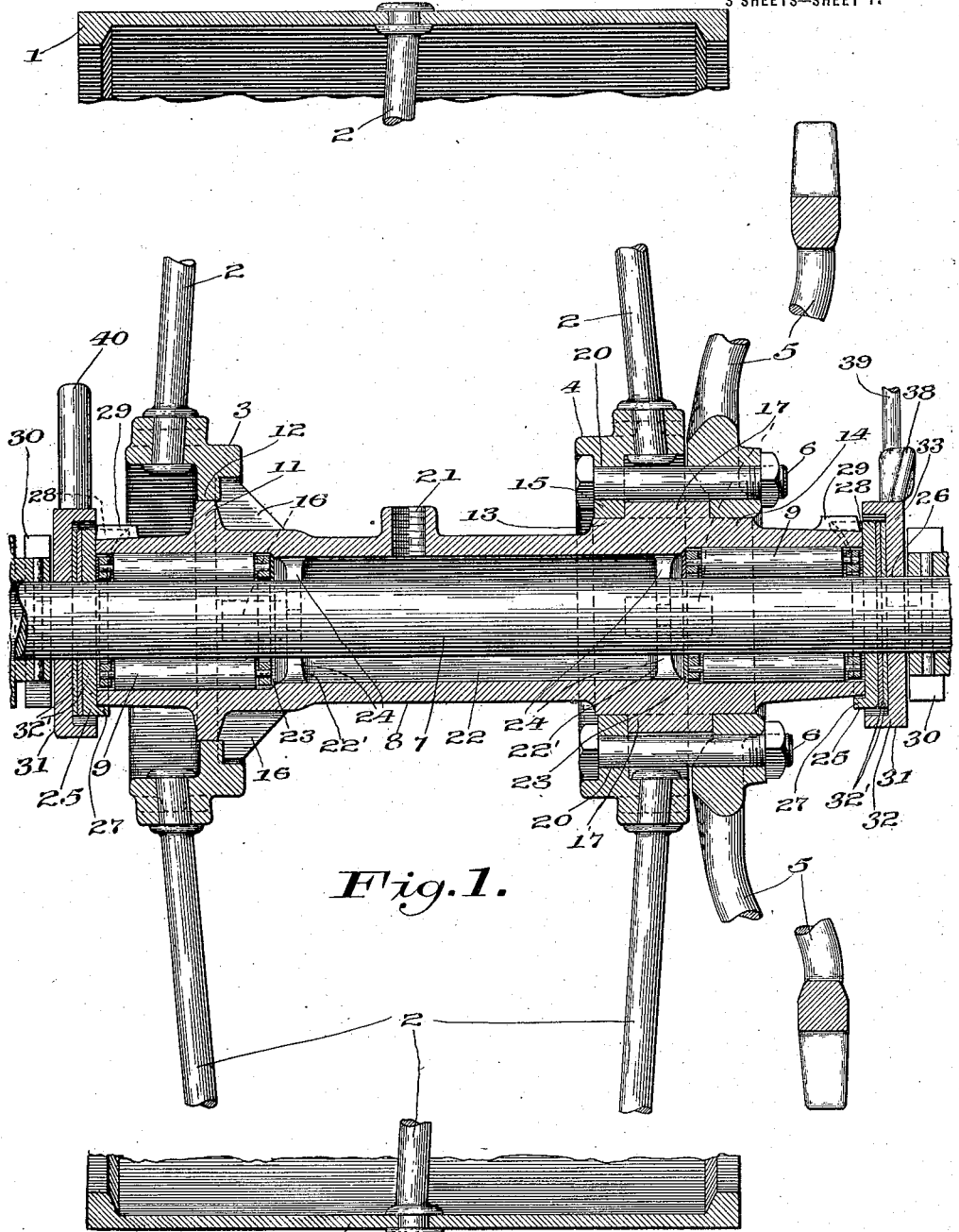

L. HOLLAND-LETZ.
TRACTION WHEEL.
APPLICATION FILED APR. 1, 1912.
1,192,897.
Patented Aug. 1, 1916.
3 SHEETS—SHEET 3.
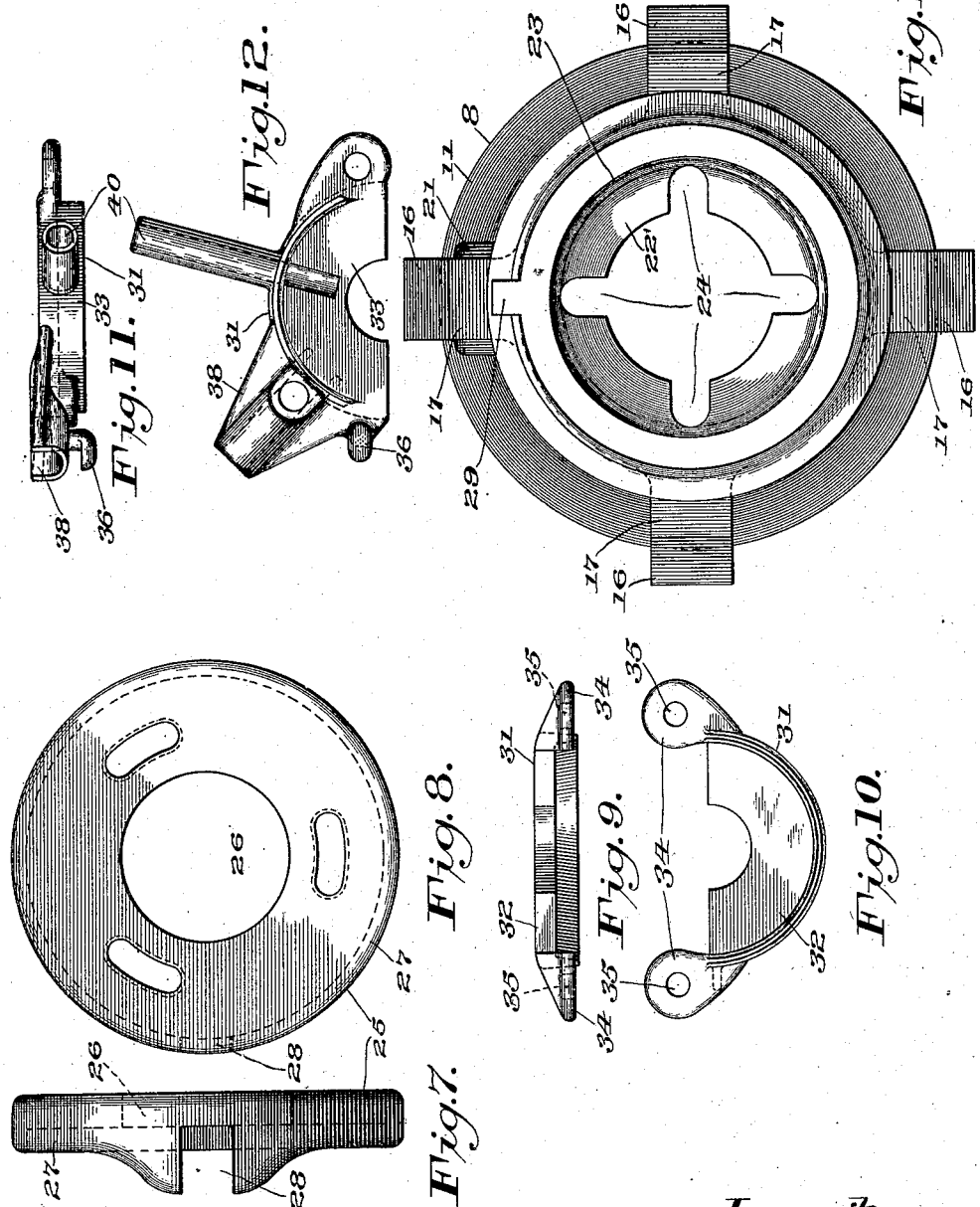
Witnesses:
C. C. Palmer
F. W. Hoffmeister
Inventor.
Lud Holland-Letz,
By O. W. Burgess
Attorney.

UNITED STATES PATENT OFFICE.

LUD HOLLAND-LETZ, OF CHICAGO, ILLINOIS, ASSIGNOR TO INTERNATIONAL HARVESTER COMPANY OF NEW JERSEY, A CORPORATION OF NEW JERSEY.

TRACTION-WHEEL.

1,192,897.      Specification of Letters Patent.      Patented Aug. 1, 1916.

Application filed April 1, 1912. Serial No. 687,902.

*To all whom it may concern:*

Be it known that I, LUD HOLLAND-LETZ, a citizen of the United States, residing at Chicago, in the county of Cook and State of Illinois, have invented certain new and useful Improvements in Traction-Wheels, of which the following is a specification.

My invention relates to traction wheels of the type commonly used in connection with grain harvesters, wherein the main driving gear is usually secured to the traction wheel in a manner to rotate therewith. Substantially all traction wheels of the class indicated are now made wholly of steel and malleable iron, the hub portion thereof consisting of separable rings to which the inner ends of the spokes are connected. A removable sleeve is received by axial openings in the rings and the main driving gear is secured to the rings.

This invention consists in providing an improved form of sleeve and hub rings and in the manner whereby the main driving gear is secured to the rings, permitting the sleeve and axle to be separated from the wheels for safety in shipping; the object of the invention being to provide a mechanism that may be readily and quickly assembled with the associated parts in operative relation, and for shipping purposes the parts may be quickly separated. These objects are attained by means of the mechanism illustrated by the accompanying drawings, in which—

Figure 1 represents a vertical sectional view of part of a harvester traction wheel having my invention forming a part thereof; Fig. 2 represents a side elevation of part of Fig. 1, and designed to illustrate the manner of attaching the main driving sprocket to the wheel and the construction and application of a sectional washer forming part of the mechanism; Fig. 3 is a cross section of one of the hub rings to which the inner ends of the spokes are attached; Fig. 4 is a side elevation of Fig. 3; Fig. 5 is a cross section of the hub ring to which the main sprocket wheel is secured; Fig. 6 is a side elevation of Fig. 5; Fig. 7 is a top plan view of a special form of washer forming part of the mechanism shown in Fig. 1; Fig. 8 is a side elevation of Fig. 7; Fig. 9 is a plan view of one of the parts of a sectional washer in the plane of its thickness; Fig. 10 is a side elevation of Fig. 9; Fig. 11 is a plan view of the other part of the sectional washer in the plane of its thickness; Fig. 12 is a side elevation of Fig. 11; and Fig. 13 is an end elevation on an enlarged scale of the hub sleeve.

The same parts are designated by like reference characters throughout the several views.

1 represents the wheel rim having the outside ends of the spokes 2 secured thereto; 3 a hub ring to which is secured the inner ends of the spokes upon one side of the wheel; 4 a hub ring to which the spokes upon the opposite side of the wheel and a main driving spocket wheel 5 are secured by means of bolts 6.

7 represents an axle upon which the wheel is journaled by means of a removable sleeve 8, the sleeve being provided at opposite ends thereof with roller bearings 9 engaging with the axle.

In harvesting machines the axle is usually provided with pinions that are secured to opposite ends thereof. The sleeve is cylindrical in form and provided near one end thereof with a circumferential flange 11 that forms a bearing for an internal annular flange 12 forming part of the hub ring 3, and on the opposite end thereof with other circumferential flanges 13 and 14 spaced apart and forming bearings for an internal annular flange 15 upon the hub ring 4 and for the sprocket wheel 5, respectively.

16 represents short radially arranged wing members arranged parallel with the axis of the sleeve at an angle of 90° apart, and having one end thereof joining the inside of the flange member 11, and the wings extending beyond the periphery of the flange, and 17 represents other wing members radially arranged between flanges 13 and 14 in line with said first mentioned wings and extending beyond the periphery of said flanges.

The annular flange 12 upon the hub ring 3 is provided with radially arranged notches 18 that permit the wing members 16 to pass therethrough when the sleeve is being passed through the hub ring, and like radially arranged notches 19 are provided in the annular flange 15 of hub ring 4 that permit the wing members 17 to pass therethrough. When the sleeve is passed through the hub rings and the wings thereon have passed through the notches and slightly beyond them, it is turned axially until said wings are at intermediate points between the notches and opposite the openings between the raised rib portions 19¹ on the annular flanges when the sleeve is pulled in a reverse direction to seat the ends of the wings against the annular flanges, and at the same time lock it against independent rotation by reason of its engagement with the raised rib portions 19¹.

The hub ring 4 is provided with a series of transverse openings 20 through the flange 15, and the main driving sprocket wheel 5 is provided with a like series of openings that receive the bolts 6 in a manner whereby the hub ring and the sprocket wheel are securely clamped against opposite ends of the wing members 17, thereby securing the sleeve in position. In order that the bolts 6 may be secured from the outside of the wheel, paired lugs 19² are provided upon the inner side of the ring 4 to position the heads of the bolts.

21 represents an oil duct extending through the wall of the sleeve and communicating with the chamber 22 surrounding the axle. 22¹ represents similar flanges at opposite ends of the chamber that separate it from the roller bearing cages 23, the flanges being provided with a series of radially arranged notches 24 forming oil ducts communicating with the chamber and the bearing mechanism.

25 represents a special form of washer having an axial opening 26 to receive the axle, and a laterally projecting rim 27 that overlaps the end of the sleeve, the rim having a widened portion that is provided with a radially arranged notch 28 that receives the end of a wing 29 integral with the sleeve in a manner to cause the washer to rotate with the wheel.

30 represents pinions secured to the opposite ends of the axle, and 31 a sectional washer interposed between the pinion and other washers 32¹ upon the axle and contacting with washers 25 and 31.

The sectional washer is made in two parts, 32 and 33, semicircular in form and joined on a diametrical line, the part 32 being provided with ear members 34 that are adapted to overlap the part 33 and provided with openings 35, and the part 33 is provided with a hook 36 that is adapted to be received by the opening in one of the ear members in a manner to form a hinge connection between the two parts of the washer. Each part is provided with a semicircular notch concentrically arranged to form an axial opening adapted to receive the axle when placed in position thereon, and a bolt 37 secures the two parts in operative relation. Part 33 is also provided with a radially arranged wing portion 38 that is provided with an opening therein that is adapted to receive the hooked end of a link 39, and the opposite end of the link may be connected with a fixed part of the harvester in a manner to prevent the washer from rotating with the wheel. The part 33 is also provided with a radially arranged oil duct 40 that conducts lubricant to the bearing surfaces of the washers.

When the assemblage of parts is complete the opposite end of the axle is provided with a pinion and a duplicate series of washers. When it is desired to remove the sleeve the sectional washer at that end carrying the sprocket wheel is removed and the clamping bolts released, the sleeve is turned axially until the wings thereon register with the notches in the annular flanges in the hub rings, and then the sleeve may be withdrawn from the hub rings.

While I have in this application described one embodiment which my invention may assume in practice, it is, of course, to be understood that the form shown is used for purposes of illustration and that the invention may be embodied in other forms without departing from its spirit.

What I claim as my invention, and desire to secure by Letters Patent, is:

1. In a traction wheel, a hub ring, a sleeve having portions thereof movable longitudinally through openings in said ring, means whereby upon subsequent rotary and longitudinal movement of said elements the same are locked against rotary movement and longitudinal movement in one direction, and a power transmitting wheel secured against said portions of the sleeve.

2. In a traction wheel, a rim, a plurality of hub rings spaced apart axially, spokes connecting said rings and said rim, a bearing sleeve longitudinally movable through said rings, means for interlocking said rings and sleeve upon a rotary and longitudinal movement of one of said elements relative to the other, a power transmitting wheel, and means rigidly connecting the same to one of said rings and said sleeve.

3. In a traction wheel, a plurality of hub rings, a wheel rim, spokes connecting said rings and rim, a sleeve having a plurality of raised portions longitudinally movable through their coöperating rings, means coöperating with said portions for interlocking said sleeve and rings upon a rotary movement of one of said elements with respect to the other, a power transmitting wheel carried on said sleeve, and a plurality of axially extending bolts rigidly connecting one of said rings and said wheel and clamping the latter on one side of one of the raised portions on said sleeve.

4. In a traction wheel, a plurality of spaced hub rings, a wheel rim, spokes connecting said rings and rim, a bearing sleeve longitudinally movable through said rings and having wing members receivable in axially disposed openings therein, means on said ring members interlocking said sleeve and ring members upon a rotary and longitudinal movement of one of the same relative to the other, a power transmitting wheel carried on said sleeve adjacent certain wing members thereon, and a single means rigidly connecting said hub rings and said power wheel and clamping the same to said sleeve.

5. In a traction wheel, a hub ring, a wheel rim connected thereto, a sleeve longitudinally movable through said ring, means for interlocking said sleeve and ring upon relative movement of one of said elements, bearing members carried in said sleeve, a sprocket wheel rigidly connected to said sleeve and hub ring, a shaft protruding through said sleeve and journaled in said bearing members, and means whereby upon removal of said sprocket and relative movement between said rings and sleeve the same may be separated longitudinally.

6. In a traction wheel, a hub ring, a wheel rim connected thereto, a bearing sleeve longitudinally movable through said ring, means for interlocking said sleeve and ring upon relative movement of one of said elements, bearing members carried in said sleeve, a sprocket wheel rigidly connected to said sleeve and hub ring, a shaft protruding through said sleeve journaled in said bearing members, and removable washers carried upon the ends of said sleeve, said sleeve being longitudinally separable from said ring upon removal of said sprocket wheel and one of said washers.

7. In a traction wheel, a hub ring, a wheel rim connected thereto, a bearing sleeve longitudinally movable through said ring, means for interlocking said sleeve and ring upon relative movement of one of said elements, bearing members carried in recesses formed in said sleeve, a sprocket wheel rigidly connected to said sleeve and said hub ring, a shaft protruding through said sleeve and engaging said bearing members, toothed members carried upon the ends of said shaft, and removable washers intermediate the ends of said shaft and the ends of said sleeve, said sleeve, bearings and shaft being longitudinally separable from said hub ring and from each other upon releasing said sprocket from said hub ring and removing one of said washers and toothed members.

8. A traction wheel having, in combination, a rim, hub rings spaced apart axially, spokes having opposite ends thereof secured to said hub rings and said rim, said hub rings having axial openings, annular flanges surrounding said openings, a sleeve, said sleeve being provided with circumferential flanges near opposite ends thereof that are received by said axial openings in a manner whereby said annular flanges have a bearing upon said circumferential flanges, radially projecting and axially alined wings integral with said sleeve adjacent said circumferential flanges and extending beyond the periphery thereof, a main driving sprocket wheel having an axial opening that receives one of said circumferential flanges, said annular flanges being provided with radially arranged notches that permit the passage of said wings when the latter are in alinement therewith, and means operative to clamp one series of said wings between the said sprocket wheel and the adjacent hub ring when said sleeve is turned angularly in a manner to bring said wings out of alinement with the notches in said annular flanges.

LUD HOLLAND-LETZ.

Witnesses:
E. L. BACON,
C. G. GUZEGORZEWST.

Copies of this patent may be obtained for five cents each, by addressing the "Commissioner of Patents, Washington, D. C."